United States Patent
Miyaura et al.

(10) Patent No.: US 9,657,679 B2
(45) Date of Patent: May 23, 2017

(54) CONTROL DEVICE AND CONTROL METHOD FOR MULTI-CYLINDER INTERNAL COMBUSTION ENGINE

(71) Applicants: Takeshi Miyaura, Toyota (JP); Yoshiyasu Ito, Toyota (JP); Ryo Suzuki, Toyota (JP); Toyomori Tsuiki, Kariya (JP); Naoyuki Yamada, Kariya (JP)

(72) Inventors: Takeshi Miyaura, Toyota (JP); Yoshiyasu Ito, Toyota (JP); Ryo Suzuki, Toyota (JP); Toyomori Tsuiki, Kariya (JP); Naoyuki Yamada, Kariya (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 309 days.

(21) Appl. No.: 14/382,342

(22) PCT Filed: Mar. 5, 2013

(86) PCT No.: PCT/IB2013/000510
§ 371 (c)(1),
(2) Date: Sep. 2, 2014

(87) PCT Pub. No.: WO2013/132320
PCT Pub. Date: Sep. 12, 2013

(65) Prior Publication Data
US 2015/0046066 A1 Feb. 12, 2015

(30) Foreign Application Priority Data

Mar. 9, 2012 (JP) .................................. 2012-053245

(51) Int. Cl.
*F02D 41/30* (2006.01)
*F02D 41/00* (2006.01)
(Continued)

(52) U.S. Cl.
CPC ........... *F02D 41/30* (2013.01); *F02D 41/008* (2013.01); *F02D 41/0085* (2013.01);
(Continued)

(58) Field of Classification Search
CPC ........ F02D 41/2441–41/2448; F02D 41/2451; F02D 41/2477–41/2483;
(Continued)

(56) References Cited

U.S. PATENT DOCUMENTS 6,209,519 B1   4/2001 Melchior et al.
6,755,176 B2 *  6/2004 Takeuchi ............ F02D 41/0085
                                                    123/299

(Continued)

FOREIGN PATENT DOCUMENTS

DE   19841260 A1   3/2000
DE   19659074 A1   6/2000
(Continued)

*Primary Examiner* — Erick Solis
*Assistant Examiner* — Robert Werner
(74) *Attorney, Agent, or Firm* — Finnegan, Henderson, Farabow, Garrett & Dunner, LLP

(57) ABSTRACT

An electronic control unit, in an idle operating state, detects a crankshaft rotation fluctuation in each cylinder using a crank angle sensor, and updates an individual correction value for a control value for each fuel injection valve as a first learned value such that a degree of deviation in the crankshaft rotation fluctuation among the cylinders reduces. The electronic control unit uses a fuel pressure sensor to detect a manner of a fuel pressure fluctuation with fuel injection by each fuel injection valve, and updates an individual correction value for a control value for each fuel (Continued)

injection valve as a second learned value based on a result of comparison between a detected temporal waveform and a basic temporal waveform. In an idle operating state, a learning rate of the second learned value is reduced until the first learned value converges for the first time as compared with after its convergence.

11 Claims, 5 Drawing Sheets

(51) Int. Cl.
 *F02D 41/14* (2006.01)
 *F02D 41/24* (2006.01)
 *F02D 41/40* (2006.01)
 *F02D 41/08* (2006.01)

(52) U.S. Cl.
 CPC ..... *F02D 41/1498* (2013.01); *F02D 41/2467* (2013.01); *F02D 41/40* (2013.01); *F02D 41/08* (2013.01); *F02D 2200/0602* (2013.01); *F02D 2250/04* (2013.01); *Y02T 10/44* (2013.01)

(58) Field of Classification Search
 CPC .... F02D 41/08–41/086; F02D 41/1486; F02D 41/1487; F02D 41/16; F02D 2200/101; F02D 2200/0602; F02D 41/34; F02D 41/40

USPC ........ 123/673, 674, 436; 701/104, 105, 110, 701/111
 See application file for complete search history.

(56) References Cited

U.S. PATENT DOCUMENTS

| | | | | |
|---|---|---|---|---|
| 7,451,037 | B2* | 11/2008 | Ikeda ................. | F02D 41/0085 123/434 |
| 7,520,260 | B2* | 4/2009 | Nakamura ............. | F01N 3/035 123/299 |
| 7,657,361 | B2* | 2/2010 | Inoue .................. | F02D 41/1498 123/436 |
| 2003/0164166 | A1 | 9/2003 | Takeuchi et al. | |
| 2008/0228374 | A1* | 9/2008 | Ishizuka ............ | F02D 41/3809 701/103 |
| 2009/0055084 | A1 | 2/2009 | Ishizuka et al. | |
| 2012/0323468 | A1 | 12/2012 | Miyaura et al. | |

FOREIGN PATENT DOCUMENTS

| | | |
|---|---|---|
| DE | 112011100884 T5 | 12/2012 |
| EP | 2378101 A1 | 10/2011 |
| JP | 2001-355500 | 12/2001 |
| JP | 4089244 | 9/2003 |
| JP | 2003-343328 | 12/2003 |
| JP | 2008-144749 | 6/2008 |
| JP | 2009-52414 | 3/2009 |
| JP | 2011-190725 | 9/2011 |

* cited by examiner

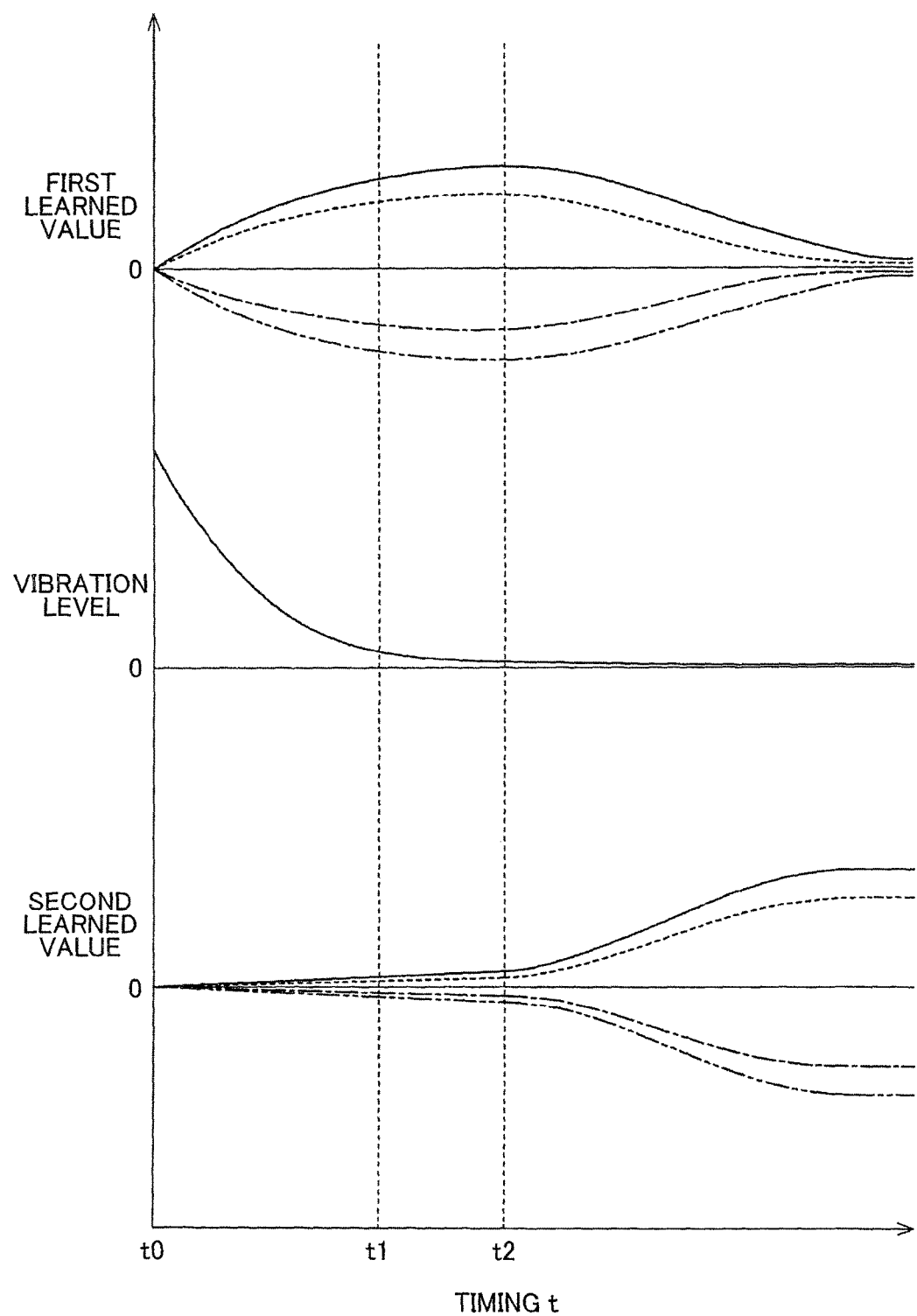

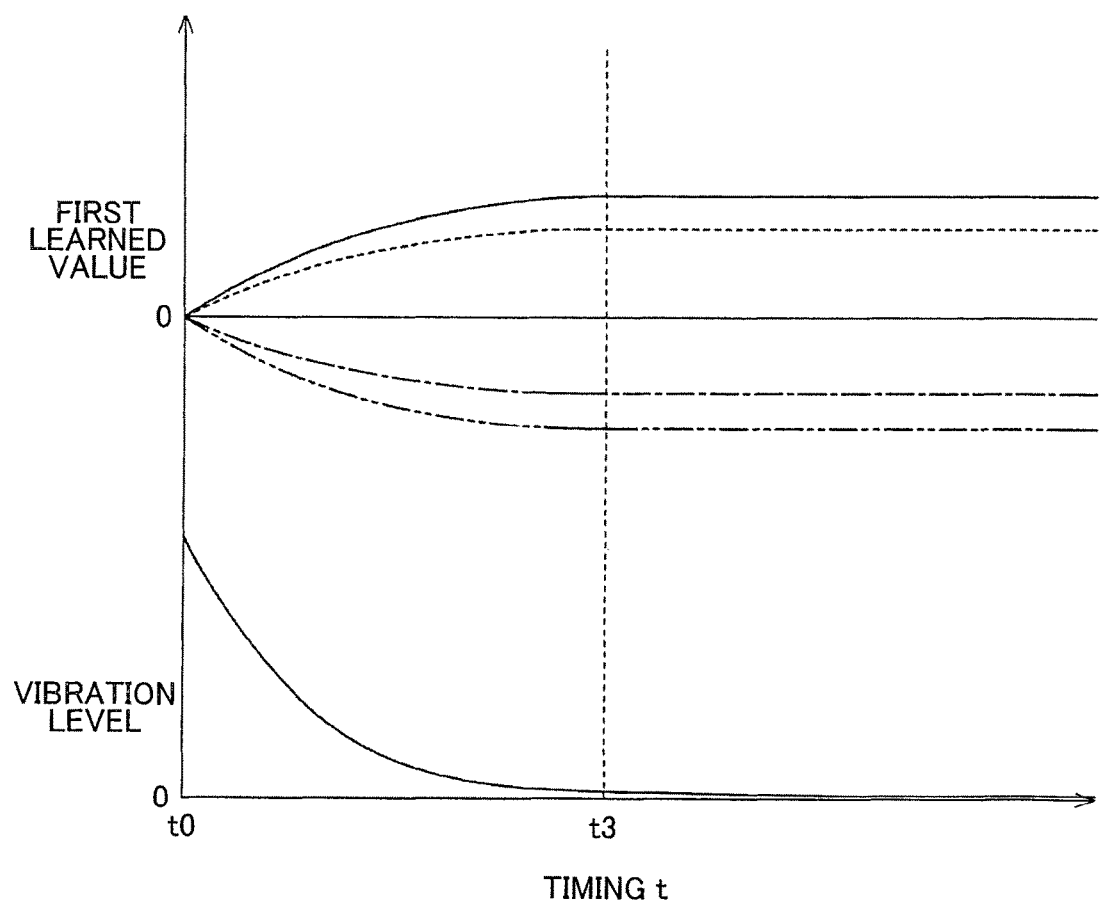

CONTROL DEVICE AND CONTROL METHOD FOR MULTI-CYLINDER INTERNAL COMBUSTION ENGINE

CROSS-REFERENCE TO RELATED APPLICATIONS

This application is a national phase application of International Application No. PCT/IB2013/000510, filed Mar. 5, 2013, and claims the priority of Japanese Application No. 2012-053245, filed Mar. 9, 2012, the content of both of which is incorporated herein by reference.

BACKGROUND OF THE INVENTION

1. Field of the Invention

The invention relates to a control device and control method for a multi-cylinder internal combustion engine.

2. Description of Related Art

Japanese Patent No. 4089244 describes a control device for a diesel engine. The control device, in an idle operating state, detects a rotation fluctuation of a crankshaft in each cylinder with the use of a crank angle sensor and then updates a correction value, as a learned value, for individually correcting a control value for each fuel injection valve such that the degree of deviation in the rotation fluctuation of the crankshaft among the cylinders reduces (hereinafter, first learning process). By updating the learned value in this way, the degree of deviation in the rotation fluctuation of the crankshaft among the cylinders reduces, so engine vibrations are reduced.

Japanese Patent Application Publication No. 2011-190725 (JP 2011-190725 A) describes a control device for a diesel engine. The diesel engine includes a fuel pressure sensor at each fuel injection valve. Each fuel pressure sensor detects a fuel pressure inside the corresponding fuel injection valve. The control device updates a correction value, as a learned value, for correcting a control value for each fuel injection valve on the basis of the fuel pressure that is detected by the corresponding fuel pressure sensor (hereinafter, second learning process). Specifically, the control device uses the corresponding fuel pressure sensor to detect a manner of fluctuation of the fuel pressure inside each fuel injection valve with the injection of fuel by the corresponding fuel injection valve, and then calculates the correction value for correcting the control value for each fuel injection valve on the basis of the result of comparison between a temporal waveform (detected temporal waveform) of a fuel injection rate that is calculated from the detected value and a basic temporal waveform. By so doing, even when there are variations due to manufacturing or aged deterioration in the fuel injection valves, it is possible to improve the controllability of fuel injection through each fuel injection valve.

Japanese Patent Application Publication No. 2008-144749 (JP 2008-144749 A) describes a configuration that, in an idle operating state, executes both the first learning process and the second learning process.

In this case, as shown in FIG. 5, the first learning process is executed from timing t0 at which the idle operating state is established. By so doing, a correction value for correcting a control value for each fuel injection valve is individually learned as a learned value. At this time, because the second learning process is executed, the correction value for correcting the control value for each fuel injection valve is individually learned on the basis of the result of comparison between a detected temporal waveform, which is calculated from a detected value of the fuel pressure inside the fuel injection valve, and a basic temporal waveform. The first learning process and the second learning process both update the correction value, as the learned value, for correcting the control value for each fuel injection valve, so control interference tends to occur in each process. When control interference has occurred, it may require a lot of time up to timing t3 at which each learned value converges or each learned value may not converge.

In addition, at this time, the first learned value includes various components that contribute to a rotation fluctuation of the crankshaft. However, if both the first learning process and the second learning process are executed, components caused by the fuel injection valves, which should be originally included in the second learned value, are included in the above various components, and it is difficult to eliminate this situation thereafter, so this may impair updating the first learned value and the second learned value with appropriate values.

SUMMARY OF THE INVENTION

The invention provides a control device and control method for a multi-cylinder internal combustion engine, which are able to early reduce engine vibrations and update a learned value in a first learning process and a learned value in a second learning process with appropriate values.

A first aspect of the invention provides a control device for a multi-cylinder internal combustion engine that includes fuel injection valves that respectively directly inject fuel into corresponding cylinders, a rotation angle sensor that detects a rotation angle of an engine output shaft and a fuel pressure sensor that detects a fuel pressure inside each fuel injection valve or in a system that supplies fuel to each fuel injection valve. The control device includes a controller configured to execute a first learning process in a predetermined engine operating state, the first learning process updating a correction value for individually correcting a control value for each fuel injection valve as a first learned value, such that a degree of deviation in a rotation fluctuation of the engine output shaft among the cylinders reduces, on the basis of the rotation fluctuation of the engine output shaft in each cylinder detected by the rotation angle sensor, the controller being configured to execute a second learning process in the predetermined engine operating state, the second process updating a correction value for individually correcting a control value for each fuel injection valve as a second learned value on the basis of the fuel pressure that is detected by the fuel pressure sensor, and the controller being configured to decrease a learning rate of the second learned value in the predetermined engine operating state until the first learned value converges for the first time as compared with after the first learned value has converged.

With the above configuration, when the first learning process is executed in the predetermined engine operating state, the correction value for correcting the control value for each fuel injection valve is updated as the first learned value such that a degree of deviation in the rotation fluctuation of the engine output shaft among the cylinders reduces. With the above configuration, the learning rate of the second learned value is decreased until the first learned value converges for the first time, so the learning rate of the first learned value relatively increases. Therefore, when there is a deviation in rotation fluctuation of the engine output shaft among the cylinders, it is possible to early reduce the degree of the deviation. Thus, it is possible to early reduce engine vibrations.

Furthermore, with the above configuration, after the first learned value converges for the first time, the learning rate of the second learned value is increased as compared with until then. Therefore, among the components of the first learned value, that is, among the components that contribute to the deviation in rotation fluctuation of the engine output shaft among the cylinders, the component due to a behavior of the fuel pressure inside each fuel injection valve or in a system that supplies fuel to each fuel injection valve is gradually shifted from the first learned value to the second learned value. Therefore, while a state where engine vibrations are reduced is maintained, it is possible to update the first learned value and the second learned value with appropriate values.

According to the aspect of the invention, it is possible to early reduce engine vibrations and to update the learned value in the first learning process and the learned value in the second learning process with appropriate values.

In the control device, the predetermined engine operating state may be an idle operating state.

In the control device, the fuel pressure sensor may be provided in correspondence with each fuel injection valve and may detect the fuel pressure inside the corresponding fuel injection valve, and, in the second learning process, the fuel pressure sensor may detects a manner of fluctuation of the fuel pressure due to fuel injection by the corresponding fuel injection valve, and the controller updates the correction value for correcting the control value for each fuel injection valve as the second learned value, on the basis of a result of comparison between a detected temporal waveform and a basic temporal waveform. The detected temporal waveform is a temporal waveform of a fuel injection rate that is calculated from the detected manner of fluctuation of the fuel pressure.

With the above configuration, after the first learned value has converged for the first time, the learning rate of the second learned value is increased as compared with until then. Therefore, among the components of the first learned value, that is, among the components that contribute to the deviation in rotation fluctuation of the engine output shaft among the cylinders, the component due to the manner of fluctuation of the pressure inside each fuel injection valve is gradually shifted from the first learned value to the second learned value. Thus, while engine vibrations are reduced, it is possible to update the first learned value and the second learned value with appropriate values.

In the control device, in the second learning process, at the time when the controller updates the second learned value, the controller may reflects the fuel pressure in the second learned value at a predetermined reflection rate, and, in the predetermined engine operating state, the controller may reduces the predetermined reflection rate until the first learned value converges for the first time as compared with after the first learned value has converged.

With the above configuration, it is possible to simply and accurately change the learning rate of the second learned value by changing the predetermined reflection rate.

In the control device, while executing the first learning process, the controller may determines that the first learned value is converged when an amount of fluctuation per unit time in the first learned value becomes smaller than or equal to a predetermined value.

With the above configuration, it is possible to accurately determine that the first learned value has converged for the first time.

In the control device, the multi-cylinder internal combustion engine may be a diesel engine.

A second aspect of the invention provides a control method for a multi-cylinder internal combustion engine that includes fuel injection valves that respectively directly inject fuel into corresponding cylinders. The control method includes: detecting a rotation fluctuation of an engine output shaft in each cylinder in a predetermined engine operating state; executing a first learning process, the first learning process updating a correction value for individually correcting a control value for each fuel injection valve as a first learned value such that a degree of deviation in the rotation fluctuation of the engine output shaft among the cylinders reduces, and executing a second learning process, the second learning process updating a correction value for individually correcting a control value for each fuel injection valve as a second learned value on the basis of a fuel pressure that is detected by a fuel pressure sensor; and, in the predetermined engine operating state, decreasing a learning rate of the second learned value until the first learned value converges for the first time as compared with after the first learned value has converged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a timing chart that shows an example of changes in first learned value, vibration level and second learned value as the second learning process is executed in the embodiment; and FIG. 5 is a timing chart that shows an example of changes in first learned value and vibration level as an existing second learning process is executed.

DETAILED DESCRIPTION OF EMBODIMENTS

Hereinafter, an example embodiment in which the invention is implemented as a control device for a diesel engine will be described with reference to FIG. 1 to FIG. 4. In the present embodiment, the diesel engine (hereinafter, internal combustion engine) having four cylinders is employed.

Figure 1:
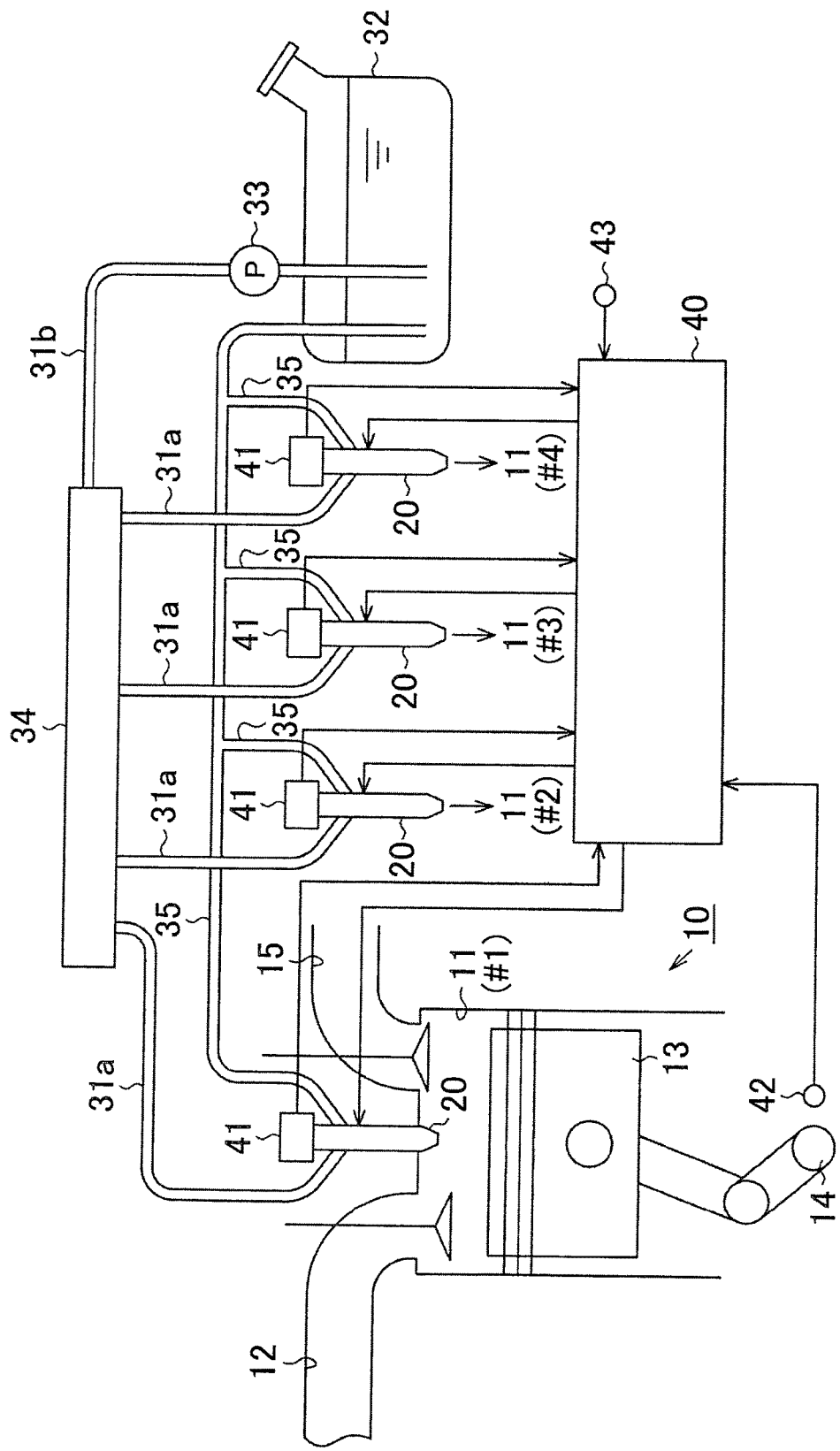
FIG. 1 is a schematic view that shows the schematic configuration of an electronic control unit that serves as a control device for an internal combustion engine according to an embodiment of the invention and the schematic configuration of the internal combustion engine.

As shown in FIG. 1, the internal combustion engine 10 includes an intake passage 12 that is used to introduce air into cylinders 11. The internal combustion engine 10 includes a fuel injection valve 20 for each of the cylinders 11 (#1 to #4). Each fuel injection valve 20 directly injects fuel into a corresponding one of the cylinders 11. The internal combustion engine 10 injects fuel from each fuel injection valve 20 into air in the each cylinder, which is compressed into a high temperature with the upward movement of a corresponding one of pistons 13, to cause self-ignition, thus causing the fuel to combust. The pistons 13 that move downward by the energy of combustion rotate a crankshaft 14 that serves as an engine output shaft. Burned exhaust gas is emitted through an exhaust passage 15.

Each fuel injection valve 20 is connected to a common rail 34 via a corresponding branch passage 31a. The common rail 34 is connected to a fuel tank 32 via a supply passage 31b. A fuel pump 33 is provided midway of the supply passage 31b. The fuel pump 33 feeds fuel under pressure toward the common rail 34. Fuel stored in the fuel tank 32 is drawn and fed under pressure by the fuel pump 33, and is then stored in the common rail 34 in a pressurized state. The fuel stored in the common rail 34 is supplied to each fuel injection valve 20 through the corresponding branch passage 31a.

A return passage 35 is connected to each fuel injection valve 20. Each return passage 35 is used to return redundant fuel in the corresponding fuel injection valve 20 to the fuel tank 32. Such various controls over the internal combustion engine 10 are executed by an electronic control unit 40 (controller in the claims). Various sensors are connected to the electronic control unit 40. The various sensors are used to acquire an engine operating state. The various sensors include a fuel pressure sensor 41 provided for each fuel injection valve 20. Each fuel pressure sensor 41 detects a fuel pressure PQ inside the corresponding fuel injection valve 20. Specifically, inside each fuel injection valve 20, the fuel pressure sensor 41 is arranged in a passage that is branched off from a fuel introducing passage to the fuel injection valve 20, and detects the fuel pressure PQ. That is, each fuel pressure sensor 41 detects the fuel pressure PQ inside the corresponding fuel injection valve 20 at the time when the corresponding fuel injection valve 20 is open. The various sensors further include a crank angle sensor 42, an accelerator operation amount sensor 43, and the like. The crank angle sensor 42 detects a crank angle CA that is a rotation angle of the crankshaft 14. The accelerator operation amount sensor 43 detects an accelerator operation amount ACCP that is an operation amount of an accelerator pedal.

The electronic control unit 40 executes various computations on the basis of signals that are output from the various sensors, and executes various controls over the internal combustion engine 10 on the basis of results of those computations. Specifically, the electronic control unit 40 calculates a target value of a fuel injection amount and selects an injection pattern on the basis of the engine operating state (in the present embodiment, the accelerator operation amount ACCP and an engine rotation speed NE). Furthermore, the electronic control unit 40 calculates a target value of a fuel injection amount in each injection (main injection, pre-injection, after-injection, and the like) of the selected injection pattern on the basis of the target value of the fuel injection amount and the engine rotation speed NE. Each fuel injection valve 20 is actuated to open on the basis of these target values. The electronic control unit 40 calculates a target value of timing at which each injection is carried out, such as start timing of main injection and an interval between pre-injection and main injection (injection interval), in addition to the target values in the injections, such as main injection, pre-injection and after-injection. A target injection period TAU in each injection (pre-injection, main injection and after-injection) is corrected on the basis of the fuel pressure PQ that is detected by the corresponding fuel pressure sensor 41.

In the present embodiment, in an idle operating state, the following first learning process is executed. In the first learning process, a rotation fluctuation of the crankshaft 14 in each cylinder 11 is detected by the crank angle sensor 42, and a correction value for individually correcting a control value for each fuel injection valve 20 is updated as a first learned value such that the degree of deviation in the rotation fluctuation of the crankshaft 14 among the cylinders 11 reduces.

Specifically, in each combustion stroke of each cylinder 11, an interval time of a pulse signal that is output from the crank angle sensor 42 is calculated, and a maximum value of the interval time between the pulse signals is set as a minimum rotation speed in that cylinder 11. A minimum value of the interval time between the pulse signals is set as a maximum rotation speed in that cylinder 11. After making such calculation for all the cylinders 11, a difference between the maximum rotation speed and the minimum rotation speed in each cylinder 11, that is, the magnitude of the rotation fluctuation in each cylinder 11, is calculated cylinder 11 by cylinder 11. Subsequently, the average of the magnitudes of the rotation fluctuations in all the cylinders 11 is calculated, and a deviation between the average and the magnitude of the rotation fluctuation in each cylinder 11 is calculated. Correction values are respectively calculated on the basis of the deviations such that these deviations reduce, and each correction value is updated as the first learned value. The target value of the fuel injection amount, which is calculated for each fuel injection valve 20, is individually corrected using the first learned value.

In the present embodiment, the following second learning process is executed. In the second learning process, a manner of fluctuation of the fuel pressure with the injection of fuel by each fuel injection valve 20 is detected by the corresponding fuel pressure sensor 41. A correction value for individually correcting a control value for each fuel injection valve 20 is updated as a second learned value on the basis of the result of comparison between a detected temporal waveform, which is a temporal waveform of a fuel injection rate from the detected value, and a basic temporal waveform. The second learning process is executed not only in an idle operating state but also in another operating state.

Figure 2:
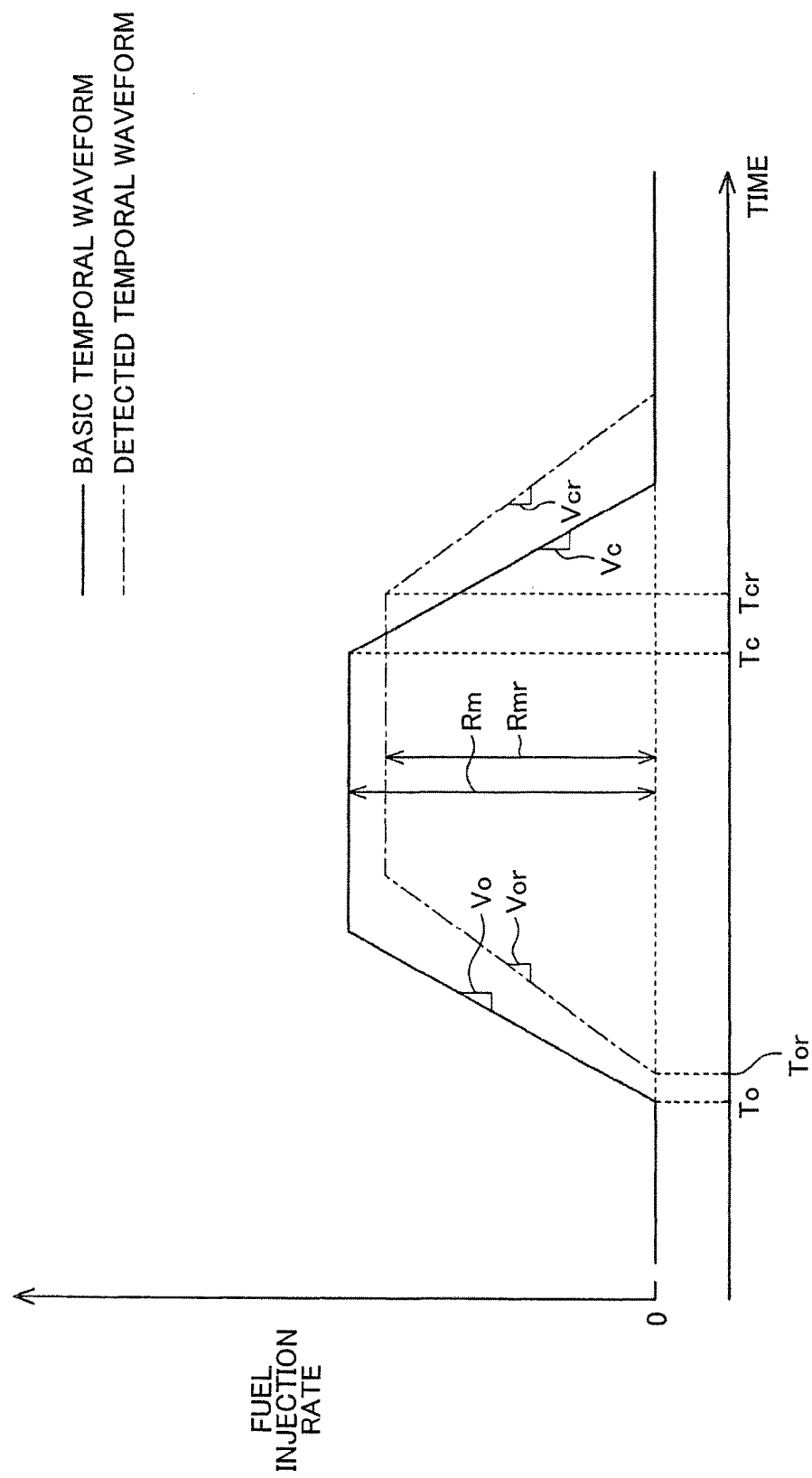
FIG. 2 is a time chart that shows an example of a detected temporal waveform and basic temporal waveform of a fuel injection rate in the embodiment.

The second learning process will be described with reference to FIG. 2. FIG. 2 is a time chart that shows an example of the detected temporal waveform and basic temporal waveform of the fuel injection rate. In the second learning process, first, the basic temporal waveform of the fuel injection rate is calculated on the basis of various calculation parameters, such as a target injection amount, target injection timing, a fuel pressure PQ, a target injection amount of first-half injection and an injection interval. The correlation between an engine operating state and a basic temporal waveform appropriate for the engine operating state is set in advance on the basis of an experiment, simulation, or the like.

As indicated by the solid line in FIG. 2, the basic temporal waveform is set to a trapezoidal waveform that is defined by timing at which each fuel injection valve 20 starts opening (valve opening operation start timing To), a rate of increase in fuel injection rate after the fuel injection valve 20 starts opening (rate of increase in injection rate Vo), timing at which the fuel injection valve 20 starts closing (valve closing operation start timing Tc), a rate of decrease Vc in fuel injection rate after the fuel injection valve 20 starts closing, and a maximum value of the fuel injection rate (maximum fuel injection rate Rm).

On the other hand, a temporal waveform of an actual fuel injection rate (detected temporal waveform) is calculated on the basis of the fuel pressure PQ that is detected by the corresponding fuel pressure sensor 41. Specifically, first, on the basis of a manner of fluctuation of the fuel pressure PQ, the valve opening operation start timing Tor, rate of increase in injection rate Vor, valve closing operation start timing Tcr, rate of decrease in injection rate Vcr and maximum injection rate Rmr of the corresponding fuel injection valve 20 are calculated.

In second correction control, during engine operation, the basic temporal waveform and the detected temporal waveform are compared with each other, and a difference in each parameter between these waveforms is sequentially calculated. Specifically, a difference $\Delta$Tog (=To–Tor) in valve opening operation start timing, a difference $\Delta$Vog (=Vo–Vor) in rate of increase in injection rate, a difference $\Delta$Tcg (=Tc–Tcr) in valve closing operation start timing, a difference $\Delta$Vcg (=Vc–Vcr) in rate of decrease in injection rate and a difference $\Delta$Rmg (=Rm–Rmr) in maximum injection rate are calculated. These differences $\Delta$Tog, $\Delta$Vog, $\Delta$Rg, $\Delta$Vcg and $\Delta$Rmg, that is, the tendency of deviation of the detected temporal waveform with respect to the basic temporal waveform, is calculated as a correction value. The second learned value for compensating variations due to manufacturing or aged deterioration of each fuel injection valve 20 is calculated on the basis of the above correction value, and is stored in the electronic control unit 40. The control value that is calculated for each fuel injection valve 20 is individually corrected using the second learned value.

The control value for each fuel injection valve 20 may suddenly vary due to, for example, variations in the fuel pressure PQ that is detected by the corresponding fuel pressure sensor 41. In the present embodiment, in order to suppress a sudden variation in the control value in this way, in the second learning process, the differences $\Delta$Tog, $\Delta$Vog, $\Delta$Tcg, $\Delta$Vcg and $\Delta$Rmg (hereinafter, correction value) each are not directly updated as the second learned value on the basis of the fuel pressure PQ that is detected by the corresponding fuel pressure sensor 41 but reflected at a predetermined reflection rate R. That is, the correction value that is calculated on the basis of the fuel pressure PQ that is detected by the corresponding fuel pressure sensor 41 is smoothed and then reflected on the second learned value. Specifically, the average of the last n correction values calculated until the current (nth) control cycle, that is, a value obtained by merely dividing the last n correction values by n, is updated as the second learned value in the current control cycle. Here, the reflection rate R is the inverse of n.

As described above, both the first learning process and the second learning process are configured to correct the control value for each fuel injection valve 20, so, when both the first learning process and the second learning process are executed in an idle operating state, control interference tends to occur with each other. In addition, such control interference tends to occur as the learning rates of these learned values get close to each other. When there occurs control interference, it may take a lot of time until each correction value converges or each correction value may not converge.

At this time, various components that contribute to a rotation fluctuation of the crankshaft 14 are included in the first learned value. However, when both the first learning process and the second learning process are executed, a component due to a manner of fluctuation of the pressure inside each fuel injection valve 20, which should be originally included in the second learned value, is included in the above various components. Because of this, it is difficult to eliminate this situation thereafter, so this may impair updating the first learned value and the second learned value with appropriate values.

In the present embodiment, in an idle operating state, by reducing the predetermined reflection rate R until the first learned value in the first learning process converges for the first time as compared with after the first learned value has converged, the learning rate of the second learned value is decreased. Specifically, normally, the average of the last ten (n=10) correction values, including the correction value in the current control cycle, is updated as the second learned value; whereas, until the first learned value converges for the first time, the average of the last one hundred (n=100) correction values, including the correction value in the current control cycle, is updated as the second learned value. By so doing, engine vibrations are early reduced, and the first learned value and the second learned value are updated with appropriate values.

Figure 3:
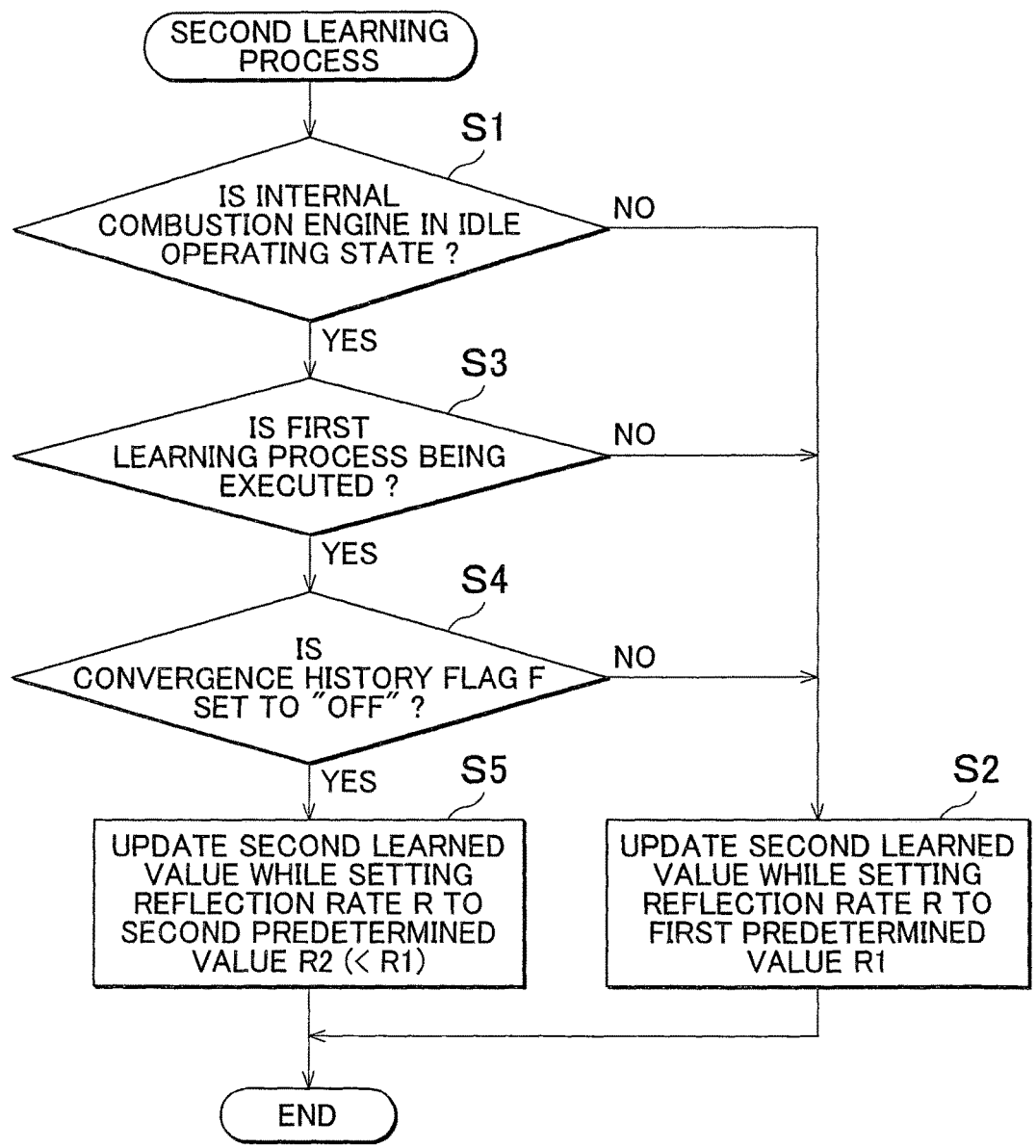
FIG. 3 is a flowchart that shows the procedure of a second learning process in the embodiment.

Next, the procedure of the second learning process in the present embodiment will be described with reference to FIG. 3. The series of processes is repeatedly executed at predetermined intervals during engine operation through the electronic control unit 40.

In this series of processes, initially, it is determined whether the internal combustion engine 10 is in an idle operating state (step S1). When the internal combustion engine 10 is not in an idle operating state (NO in step S1), the process subsequently proceeds to step S2, and updates the second learned value while setting the reflection rate R to a first predetermined value R1 (R1=0.1), after which the series of processes once ends. That is, by setting the reflection rate R to the first predetermined value R1, the average of the last ten (n=10) correction values, including the correction value in the current control cycle, is updated as the second learned value.

On the other hand, when the internal combustion engine 10 is in an idle operating state (YES in step S1), the process subsequently proceeds to step S3, and it is determined whether the first learning process is being executed. Here, when the first learning process is not being executed (NO in step S3), the process proceeds to step S2, and the second learned value is updated while setting the reflection rate R to the first predetermined value R1 (R1=0.1), after which the series of processes once ends.

In step S3, when the first learning process is being executed (YES in step S3), the process subsequently proceeds to step S4, and it is determined whether a convergence history flag F is "OFF". The convergence history flag F is initially set to "OFF". After the internal combustion engine 10 enters an idle operating state, when the amount of fluctuation per unit time in the first learned value becomes lower than or equal to a predetermined value for the first time, it is determined that the first learned value has converged, and the convergence history flag is set to "ON".

When the convergence history flag F is set to "OFF" in step S4 (YES in step S4), it is determined that the first learned value has not converged yet, and the process subsequently proceeds to step S5. In step S5, the second learned value is updated while the reflection rate R is set to a second predetermined value R2 (R2=0.01), after which the series of processes once ends. That is, by setting the reflection rate R to the second predetermined value R2, the average value of the last one hundred (n=100) correction values, including the correction value in the current control cycle, is updated as the second learned value.

On the other hand, when the convergence history flag F is not "OFF" in step S4 (NO in step S4), it is determined that the first learned value has converged at least once, and the process subsequently proceeds to step S2, and the second learned value is updated while setting the reflection rate R to the first predetermined value R1 (R1=0.1), after which the series of processes once ends.

Next, the operation of the present embodiment will be described with reference to FIG. 4. As shown in the first learned value in FIG. 4, when the internal combustion engine enters an idle operating state at timing t0 and then the first learning process is executed, the correction value for correcting the control value for each fuel injection valve 20 is updated as the first learned value in each combustion cycle such that the degree of deviation in rotation fluctuation of the crankshaft 14 among the cylinders 11 reduces. Therefore, for example, as indicated by the solid line or broken line in the first learned value in FIG. 4, when the first learning process is executed at timing t0, the absolute value of the first learned value gradually increases. Accordingly, the vibration level is gradually reduced (see the vibration level in FIG. 4).

According to the present embodiment, the learning rate of the second learned value is decreased until timing t2 at which the first learned value converges for the first time, so the learning rate of the first learned value relatively increases. Therefore, when there is a deviation in rotation fluctuation of the crankshaft 14 among the cylinders 11, the degree of the deviation is early reduced. Thus, timing t1 at which the vibration level is lower than or equal to an ignorable level is early reached (vibration level in FIG. 4).

According to the present embodiment, after the first learned value has converged for the first time at timing t2, the learning rate of the second learned value is increased as compared with the learning rate until then. Therefore, among the components of the first learned value, that is, among the components that contribute to the deviation in rotation fluctuation of the crankshaft 14 among the cylinders 11, the component due to a manner of fluctuation of the pressure inside each fuel injection valve 20 is gradually shifted from the first learned value to the second learned value. Therefore, after timing t2, while the state where the vibration level is reduced is maintained (vibration level in FIG. 4), the absolute value of the first learned value gradually reduces (first learned value in FIG. 4); whereas the absolute value of the second learned value gradually increases (second learned value in FIG. 4).

With the above-described control device for a multi-cylinder internal combustion engine according to the present embodiment, the following advantageous effects are obtained. The internal combustion engine 10 is a multi-cylinder diesel engine, and includes the fuel injection valves 20 that directly inject fuel into the corresponding cylinders 11. The electronic control unit 40 includes the crank angle sensor 42 that detects the crank angle and the fuel pressure sensors 41 that are respectively provided for the fuel injection valves 20 and that respectively detect the fuel pressures PQ inside the corresponding fuel injection valves 20. In an idle operating state, the first learning process is executed. In the first learning process, the rotation fluctuation of the crankshaft 14 in each cylinder 11 is detected with the use of the crank angle sensor 42, and the correction value for individually correcting the control value for each fuel injection valve 20 is updated as the first learned value such that the degree of deviation in rotation fluctuation of the crankshaft 14 among the cylinders 11 reduces. In addition, the second learning process is executed. In the second learning process, a manner of fluctuation of fuel pressure with the injection of fuel by each fuel injection valve 20 is detected with the use of the corresponding fuel pressure sensor 41, and the correction value for individually correcting the control value for each fuel injection valve 20 is updated as the second learned value on the basis of the result of comparison between the detected temporal waveform, which is a temporal waveform of a fuel injection rate from the detected value, and the basic temporal waveform. Specifically, in the second learning process, at the time of updating the second learned value, the fuel pressure PQ that is detected by the corresponding fuel pressure sensor 41 is reflected at the predetermined reflection rate R. Then, in an idle operating state, by reducing the above-described predetermined reflection rate R until the first learned value converges for the first time as compared with after the first learned value has converged, the learning rate of the second learned value is decreased.

With the above configuration, it is possible to early reduce engine vibrations and to update the learned value in the first learning process and the learned value in the second learning process with appropriate values. In addition, by changing the above-described predetermined reflection rate R, it is possible to simply and accurately change the learning rate of the second learned value.

In the present embodiment, it is determined that the first learned value has converged when the amount of fluctuation per unit time in the first learned value becomes smaller than or equal to a predetermined value while the first learning process is being executed. With the above configuration, it is possible to accurately determine that the first learned value has converged for the first time.

The control device for a multi-cylinder internal combustion engine according to the invention is not limited to the configuration illustrated in the above embodiment; it may be implemented, for example, in the following form that is appropriately modified from the above embodiment.

In the above-described embodiment, the control device for a diesel engine is illustrated; however, the internal combustion engine to which the invention is applied is not limited to this configuration. Instead, for example, the invention may be applied to a gasoline engine that includes fuel injection valves that directly inject fuel into corresponding cylinders.

In the above-described embodiment, the average of the last n learned values are employed at the time of updating the second learned value, and the reflection rate R at the time when the fuel pressure detected in the current control cycle is reflected on the second learned value to be updated is changed by changing the "n". However, a mode in which the learning rate of the second learned value is changed is not limited to this configuration. It is also applicable that the "n" is set to a fixed value and the weight of the fuel pressure detected in the current control cycle is changed.

In the above-described embodiment, the first learning process and the second learning process are executed at the same time in an idle operating state. Instead, it is also applicable that the second learning process is not executed until the first learned value converges for the first time.

In the above-described embodiment, each fuel pressure sensor 41 is used to detect the fuel pressure PQ inside the corresponding fuel injection valve 20; instead, each fuel pressure sensor may be used to detect a fuel pressure in the corresponding branch passage 31a.

In the above-described embodiment, the first learning process is executed in an idle operating state; instead, the first learning process may be executed in another stable engine operating state.

The invention claimed is:

1. A control device for a multi-cylinder internal combustion engine that includes fuel injection valves that respectively directly inject fuel into corresponding cylinders, a rotation angle sensor that detects a rotation angle of an engine output shaft and a fuel pressure sensor that detects a fuel pressure inside each fuel injection valve or in a system that supplies fuel to each fuel injection valve, the control device comprising:

a controller configured to:
(i) execute a first learning process in a predetermined engine operating state, the first learning process updating a correction value for individually correcting a control value for each fuel injection valve as a first learned value, based on a rotation fluctuation of the engine output shaft in each cylinder detected by the rotation angle sensor, and the first learning process reducing a degree of deviation in the rotation fluctuation among the cylinders,
(ii) execute a second learning process in the predetermined engine operating state, the second learning process updating a correction value for individually correcting a control value for each fuel injection valve as a second learned value, based on the fuel pressure detected by the fuel pressure sensor, and
(iii) decrease a learning rate of the second learned value in the predetermined engine operating state until the first learned value converges for the first time as compared with the learning rate of the second learned value after the first learned value has converged, wherein in the second learning process, at the time when the controller updates the second learned value, the controller is configured to reflect the fuel pressure in the second learned value at a predetermined reflection rate,
in the predetermined engine operating state, the controller is configured to reduce the predetermined reflection rate until the first learned value converges for the first time as compared with after the first learned value has converged, and
the controller is further configured to actuate each of the fuel injection valves to open on the basis of target values calculated from at least one of the first and second learned values.

2. The control device according to claim 1, wherein the predetermined engine operating state is an idle operating state.

3. The control device according to claim 1, wherein
the fuel pressure sensor is provided in correspondence with each fuel injection valve and the fuel pressure sensor is configured to detect the fuel pressure inside the corresponding fuel injection valve,
in the second learning process, the fuel pressure sensor is configured to detect variation in the fuel pressure due to fuel injection by the corresponding fuel injection valve,
the controller is configured to update the correction value for correcting the control value for each fuel injection valve as the second learned value, based on a result of comparison between a detected temporal waveform and a basic temporal waveform, and
the detected temporal waveform is a temporal waveform of a fuel injection rate, that is calculated from the detected variation in the fuel pressure.

4. The control device according to claim 1, wherein
the controller is further configured to, while executing the first learning process, determine that the first learned value is converged when an amount of fluctuation per unit time in the first learned value becomes smaller than or equal to a predetermined value.

5. The control device according to claim 1, wherein
the multi-cylinder internal combustion engine is a diesel engine.

6. A control method for a multi-cylinder internal combustion engine that includes fuel injection valves that respectively directly inject fuel into corresponding cylinders and a controller, the control method comprising:
detecting a rotation fluctuation of an engine output shaft in each cylinder in a predetermined engine operating state;
executing, by the controller, a first learning process, the first learning process updating a correction value for individually correcting a control value for each fuel injection valve as a first learned value such that a degree of deviation in the rotation fluctuation of the engine output shaft among the cylinders reduces;
executing, by the controller, a second learning process, the second learning process updating a correction value for individually correcting a control value for each fuel injection valve as a second learned value based on a fuel pressure that is detected by a fuel pressure sensor; and
in the predetermined engine operating state, decreasing, by the controller, a learning rate of the second learned value until the first learned value converges for the first time as compared with after the first learned value has converged, wherein
in the second learning process, at the time of updating the second learned value, the fuel pressure is reflected in the second learned value at a predetermined reflection rate,
in the predetermined engine operating state, the predetermined reflection rate is reduced by the controller until the first learned value converges for the first time as compared with after the first learned value has converged, and
the control method further comprises actuating, by the controller, each of the fuel injection valves to open on the basis of target values calculated from at least one of the first and second learned values.

7. The control method according to claim 6, wherein
the predetermined engine operating state is an idle operating state.

8. The control method according to claim 6, wherein
the fuel pressure inside each fuel injection valve is detected,
a of variation in the fuel pressure with injection of fuel by each fuel injection valve is detected in the second learning process,
the correction value for correcting the control value for each fuel injection valve is updated as the second learned value based on a result of comparison between a detected temporal waveform and a basic temporal waveform, and
the detected temporal waveform is a temporal waveform of a fuel injection rate that is calculated from the detected variation in the fuel pressure.

9. A control device for a multi-cylinder internal combustion engine that includes fuel injection valves that respectively directly inject fuel into corresponding cylinders, a rotation angle sensor that detects a rotation angle of an engine output shaft and a fuel pressure sensor that detects a fuel pressure inside each fuel injection valve or in a system that supplies fuel to each fuel injection valve, the control device comprising:
a controller configured to:
(i) execute a first learning process in a predetermined engine operating state, the first learning process updating a correction value for individually correcting a control value for each fuel injection valve as a first learned value, based on a rotation fluctuation of the engine output shaft in each cylinder detected by the rotation angle sensor, and the first learning process reducing a degree of deviation in the rotation fluctuation among the cylinders,
(ii) execute a second learning process in the predetermined engine operating state, the second learning process updating a correction value for individually correcting a control value for each fuel injection valve as a second learned value, based on the fuel pressure detected by the fuel pressure sensor,
(iii) decrease a learning rate of the second learned value in the predetermined engine operating state until the first learned value converges for the first time as compared with the learning rate of the second learned value after the first learned value has converged, wherein
in the second learning process, at the time when the controller updates the second learned value, the controller is configured to reflect the fuel pressure in the second learned value at a predetermined reflection rate,
in the predetermined engine operating state, the controller is configured to reduce the predetermined reflection rate until the first learned value converges for the first time as compared with after the first learned value has converged, and
the controller is further configured to actuate each of the fuel injection valves to open on the basis of target values calculated from at least one of the first and second learned values.

10. A control device for a multi-cylinder internal combustion engine that includes fuel injection valves that respectively directly inject fuel into corresponding cylinders, a rotation angle sensor that detects a rotation angle of an engine output shaft and a fuel pressure sensor that detects a fuel pressure inside each fuel injection valve or in a system that supplies fuel to each fuel injection valve, the control device comprising:
a controller configured to:
(i) execute a first learning process in a predetermined engine operating state, the first learning process updating a correction value for individually correcting a control value for each fuel injection valve as a first learned value, based on a rotation fluctuation of the engine output shaft in each cylinder detected by the rotation angle sensor, and the first learning process reducing a degree of deviation in the rotation fluctuation among the cylinders,
(ii) execute a second learning process in the predetermined engine operating state, the second process updating a correction value for individually correcting a control value for each fuel injection valve as a second learned value, based on the fuel pressure detected by the fuel pressure sensor,
(iii) decrease a learning rate of the second learned value in the predetermined engine operating state until the first learned value converges for the first time as compared with the learning rate of the second learned value after the first learned value has converged, wherein
at the time when the controller executes the first learning process, the controller is configured to determine that the first learned value has converged when an amount of fluctuation per unit time in the first learned value becomes smaller than or equal to a predetermined value, and
the controller is further configured to actuate each of the fuel injection valves to open on the basis of target values calculated from at least one of the first and second learned values.

11. A control method for a multi-cylinder internal combustion engine that includes fuel injection valves that respectively directly inject fuel into corresponding cylinders and a controller, the control method comprising:
detecting a rotation fluctuation of an engine output shaft in each cylinder in a predetermined engine operating state;
executing, by the controller, a first learning process, the first learning process updating a correction value for individually correcting a control value for each fuel injection valve as a first learned value such that a degree of deviation in the rotation fluctuation of the engine output shaft among the cylinders reduces;
executing, by the controller, a second learning process, the second learning process updating a correction value for individually correcting a control value for each fuel injection valve as a second learned value based on a fuel pressure that is detected by a fuel pressure sensor; and
in the predetermined engine operating state, decreasing, by the controller, a learning rate of the second learned value until the first learned value converges for the first time as compared with after the first learned value has converged, wherein
while the first learning process is being executed, it is determined that the first learned value has converged when an amount of fluctuation per unit time in the first learned value becomes smaller than or equal to a predetermined value, and
the control method further comprises actuating, by the controller, each of the fuel injection valves to open on the basis of target values calculated from at least one of the first and second learned values.

\* \* \* \* \*